United States Patent
Ohara et al.

(10) Patent No.: US 12,359,597 B2
(45) Date of Patent: Jul. 15, 2025

(54) EXHAUST STRUCTURE AND INJECTOR ATTACHMENT MEMBER

(71) Applicant: Isuzu Motors Limited, Kanagawa (JP)

(72) Inventors: Isao Ohara, Fujisawa (JP); Junji Sakai, Fujisawa (JP); Yuki Ueda, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 0 days.

(21) Appl. No.: 18/716,578

(22) PCT Filed: Sep. 15, 2022

(86) PCT No.: PCT/JP2022/034545
§ 371 (c)(1),
(2) Date: Jun. 5, 2024

(87) PCT Pub. No.: WO2023/105876
PCT Pub. Date: Jun. 15, 2023

(65) Prior Publication Data
US 2025/0052182 A1    Feb. 13, 2025

(30) Foreign Application Priority Data
Dec. 9, 2021 (JP) .................................. 2021-200065

(51) Int. Cl.
*F01N 3/20* (2006.01)
*F01N 3/24* (2006.01)

(52) U.S. Cl.
CPC .............. *F01N 3/2066* (2013.01); *F01N 3/24* (2013.01); *F01N 2610/02* (2013.01); *F01N 2610/1453* (2013.01)

(58) Field of Classification Search
CPC ...... F01N 3/2066; F01N 3/24; F01N 2610/02; F01N 2610/1453
(Continued)

(56) References Cited

U.S. PATENT DOCUMENTS 10,508,579 B2 * 12/2019 Fischer ................. F01N 3/2892
2008/0155973 A1    7/2008 Maruyama et al.
(Continued)

FOREIGN PATENT DOCUMENTS

| JP | 2005-127271 | 5/2005 |
| JP | 2008-151088 | 7/2008 |

(Continued)

*Primary Examiner* — Mark A Laurenzi
*Assistant Examiner* — Kelsey L Stanek

(57) ABSTRACT

The exhaust structure comprises an exhaust pipe through which exhaust gas flows, a urea water injector that injects urea water, a SCR catalyst provided downstream of the injection position of the urea water, and an attachment member for fixedly attaching the urea water injector to the exhaust pipe. The attachment member is a cylindrical body passing through in the axial direction, and is attached to the exhaust pipe such that a nozzle hole of a urea water injector is disposed in one opening part and the other opening part faces the inside of the exhaust pipe on the upstream side of the SCR catalyst. The inner peripheral surface of the attachment member is provided with a rib that causes exhaust gas flowing from the other opening part to the one opening part to change direction so as to flow from the one opening part to the other opening part.

6 Claims, 4 Drawing Sheets

(58) Field of Classification Search
USPC .......................................................... 60/272
See application file for complete search history.

(56) References Cited

U.S. PATENT DOCUMENTS

2015/0361853 A1* 12/2015 Nagata .................. F01N 3/2896
60/303
2016/0017777 A1   1/2016 Kasai et al.

FOREIGN PATENT DOCUMENTS

| JP | 2009-115057 | 5/2009 |
| JP | 2018-053897 | 4/2018 |
| WO | WO 2014/115461 | 7/2014 |

* cited by examiner

EXHAUST STRUCTURE AND INJECTOR ATTACHMENT MEMBER

TECHNICAL FIELD

The present disclosure relates to an exhaust structure and an injector attachment member.

BACKGROUND ART

In the related art, there is a known exhaust structure including an exhaust pipe through which exhaust gas discharged from an internal combustion engine flows; a urea water injector (may be referred to as a dosing module) that ejects urea water into the exhaust pipe; and a SCR (selective catalytic reduction) catalyst that is provided on the downstream side of an ejection position of the urea water inside the exhaust pipe (refer to, for example, PTL 1).

In the aforementioned exhaust structure, the urea water ejected from the urea water injector is hydrolyzed by the heat of the exhaust gas. Ammonia generated as a result of this is supplied to the SCR catalyst, and, at the SCR catalyst, nitrogen oxide (NOx) in the exhaust gas is reduced into nitrogen by the ammonia.

CITATION LIST

Patent Literature

PTL 1
Japanese Patent Application Laid-Open No. 2018-53897

SUMMARY OF INVENTION

Technical Problem

While the flow of exhaust gas in the aforementioned exhaust structure is mainly a flow toward the SCR catalyst, a reverse flow toward a nozzle hole (may be also referred to as a nozzle or an ejection port) of the urea water injector may be generated. Consequently, the urea water ejected from the urea water injector may be pushed back toward the nozzle hole and may cause adhesion of urea (specifically, a whitish solid substance that is a by-product in the generating process of ammonia) to the vicinity of the nozzle hole.

An object of one aspect of the present disclosure is to provide an exhaust structure that is capable of suppressing adhesion of urea to the vicinity of a nozzle hole.

Solution to Problem

An exhaust structure according to one aspect of the present disclosure includes: an exhaust pipe through which exhaust gas discharged from an internal combustion engine flows; a urea water injector that ejects urea water; a selective catalytic reduction (SCR) catalyst that is provided on a downstream side of an ejection position of the urea water inside the exhaust pipe; and an injector attachment member for securely attaching the urea water injector to the exhaust pipe, in which the injector attachment member is a cylindrical body through which a hole extends in an axial direction, and the injector attachment member is attached to the exhaust pipe such that a nozzle hole of the urea water injector is disposed at one opening portion of the injector attachment member and that another opening portion of the injector attachment member faces an inside of the exhaust pipe on an upstream side of the SCR catalyst, and in which an inner peripheral surface of the injector attachment member is provided with a rib that changes a flow direction of the exhaust gas from the other opening portion toward the one opening portion to a flow direction from the one opening portion toward the other opening portion.

An injector attachment member according to one aspect of the present disclosure is a member to be used in an exhaust structure including an exhaust pipe through which exhaust gas discharged from an internal combustion engine flows, a urea water injector that ejects urea water, and a selective catalytic reduction (SCR) catalyst that is provided on a downstream side of an ejection position of the urea water inside the exhaust pipe, the injector attachment member being a member to be used for securely attaching the urea water injector to the exhaust pipe, in which the injector attachment member is a cylindrical body through which a hole extends in an axial direction, and the injector attachment member is attached to the exhaust pipe such that a nozzle hole of the urea water injector is disposed at one opening portion of the injector attachment member and that another opening portion of the injector attachment member faces an inside of the exhaust pipe on an upstream side of the SCR catalyst, and wherein the injector attachment member is provided with, at an inner peripheral surface of the injector attachment member, a rib that changes a flow direction of the exhaust gas from the other opening portion toward the one opening portion to a flow direction from the one opening portion toward the other opening portion.

Advantageous Effects of Invention

According to the present disclosure, it is possible to suppress adhesion of urea to the vicinity of a nozzle hole.

DESCRIPTION OF EMBODIMENTS

Underlying Knowledge Forming Basis of the Present Disclosure

Figure 1:
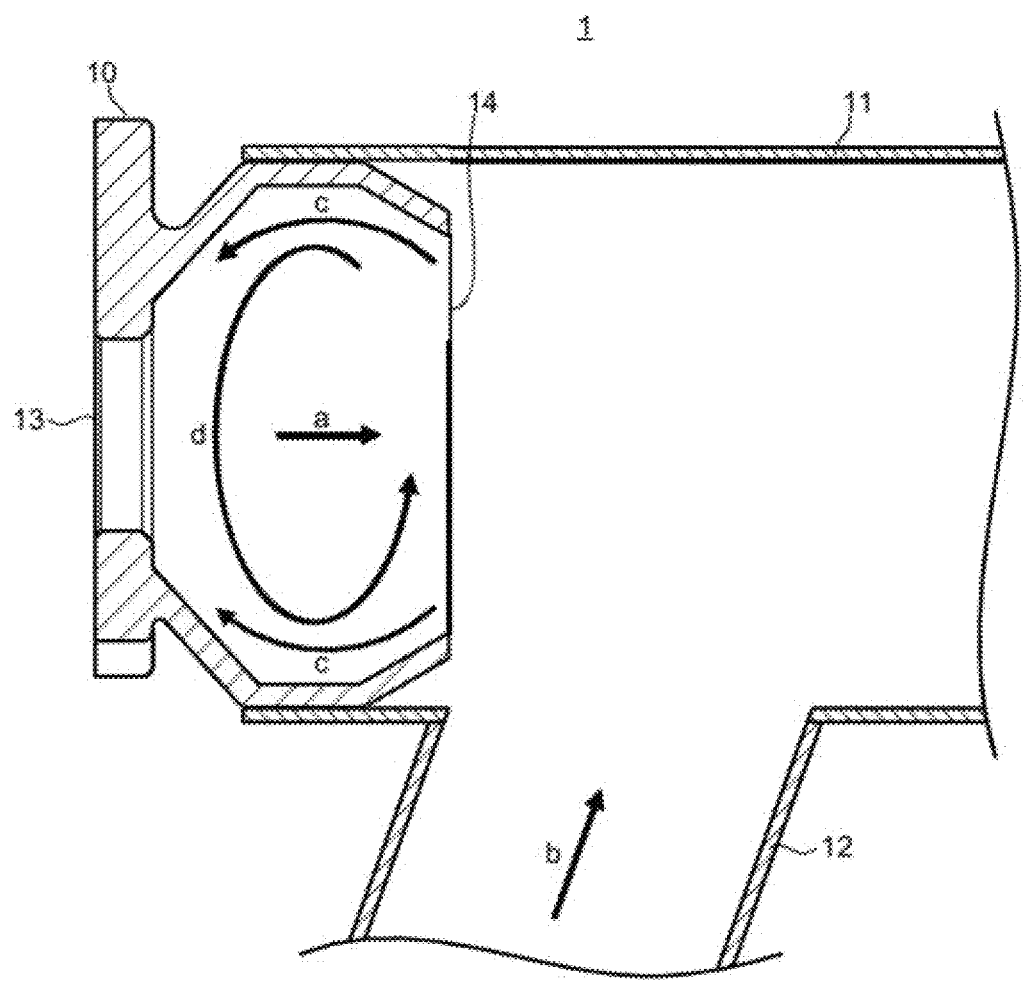
FIG. 1 is a side sectional view schematically illustrating an exhaust structure according to a comparative example of the present disclosure.

First, underlying knowledge forming basis of the present disclosure will be described with reference to FIG. 1. FIG. 1 is a side sectional view schematically illustrating exhaust structure 1 as a comparative example of the present disclosure.

Exhaust structure 1 includes injector attachment member 10, first exhaust pipe 11, second exhaust pipe 12, a urea water injector (not illustrated), and a SCR catalyst (not illustrated).

Each of first exhaust pipe 11 and second exhaust pipe 12 is a cylindrical body through which exhaust gas discharged from an internal combustion engine (not illustrated) flows.

Injector attachment member 10 (described later in detail) is securely provided at an upstream end portion of first exhaust pipe 11. Second exhaust pipe 12 (described later in detail) is connected to first exhaust pipe 11. While not illustrated, first exhaust pipe 11 is provided with the SCR catalyst at a position on the downstream side of a position at which second exhaust pipe 12 is connected to first exhaust pipe 11. For example, the SCR catalyst is accommodated in a case having a diameter larger than an inside diameter of first exhaust pipe 11.

One end of second exhaust pipe 12 is, for example, connected to an exhaust manifold (not illustrated). As illustrated in FIG. 1, another end of second exhaust pipe 12 is connected to first exhaust pipe 11. For convenience, FIG. 1 illustrates second exhaust pipe 12 that is connected to a lower portion of first exhaust pipe 11. A position to which second exhaust pipe 12 is connected is, however, not limited to a lower location of first exhaust pipe 11.

Arrow b in FIG. 1 indicates a flow direction of exhaust gas in second exhaust pipe 12. That is, exhaust gas that flows through second exhaust pipe 12 flows into first exhaust pipe 11. The exhaust gas that has flowed into first exhaust pipe 11 flows in first exhaust pipe 11 from left to right in FIG. 1.

Injector attachment member 10 is a member for securely attaching the urea water injector to first exhaust pipe 11. While not illustrated, the urea water injector is fixed to, of injector attachment member 10, a portion (a flange portion having first opening portion 13) disposed outside first exhaust pipe 11.

As illustrated in FIG. 1, injector attachment member 10 is a cylindrical body through which a hole extends in an axial direction (the left-right direction in FIG. 1), and injector attachment member 10 has first opening portion 13 and second opening portion 14. That is, injector attachment member 10 has a through hole (no sign is given) extending in the axial direction thereof with first opening portion 13 and second opening portion 14 at two ends of the through hole. This through hole is used as an ejection passage for the urea water.

First opening portion 13 is disposed outside first exhaust pipe 11. A nozzle hole (not illustrated) of the urea water injector is disposed at first opening portion 13. Arrow a in FIG. 1 indicates an ejection direction of the urea water. That is, the urea water injector ejects the urea water into the through hole toward second opening portion 14.

Second opening portion 14 is disposed inside first exhaust pipe 11. In other words, second opening portion 14 is disposed to face the inside of first exhaust pipe 11 on the upstream side of the SCR catalyst.

The urea water that has flowed into first exhaust pipe 11 through second opening portion 14 is hydrolyzed by the heat of the exhaust gas. Ammonia generated as a result of this is supplied to the SCR catalyst. Then, at the SCR catalyst, nitrogen oxide (NOx) in the exhaust gas is reduced into nitrogen by the ammonia.

Next, a problem in exhaust structure 1 having the aforementioned configuration will be described.

As described above, the exhaust gas that has flowed into first exhaust pipe 11 from second exhaust pipe 12 basically flows in first exhaust pipe 11 from left to right in FIG. 1, that is, toward the SCR catalyst. However, a flow in a direction opposite to the direction of this flow may be generated.

Specifically, part of the exhaust gas flows from first exhaust pipe 11 into injector attachment member 10 and flows, while swirling, toward the nozzle hole (may be referred to as first opening portion 13) of the urea water injector. Arrow c in FIG. 1 indicates a flow direction of the exhaust gas that flows in injector attachment member 10 toward the nozzle hole. The urea water ejected in the direction indicated by arrow a is pushed back by this flow toward the nozzle hole.

Then, due to the exhaust gas continuously flowing from second opening portion 14 into injector attachment member 10, the exhaust gas that has flowed into injector attachment member 10 accumulates in injector attachment member 10. Arrow d in FIG. 1 indicates exhaust gas (swirl flow) accumulating in injector attachment member 10.

Such accumulation of the exhaust gas may cause adhesion of urea (specifically, a whitish solid substance that is a by-product of the generating process of ammonia) to the vicinity of the nozzle hole of the urea water injector. As a result, efficiency in ejection of the urea water may decrease and sufficient ammonia may be not supplied to the SCR catalyst, which may lead to poor purification of exhaust gas.

Under such circumstances, an object of the present disclosure is to make it possible to suppress adhesion of urea to the vicinity of a nozzle hole of a urea water injector.

Embodiment of Present Disclosure

Next, an embodiment of the present disclosure will be described with reference to FIG. 2 to FIG. 4. Components that are common among the drawings are given identical signs.

Figure 2:
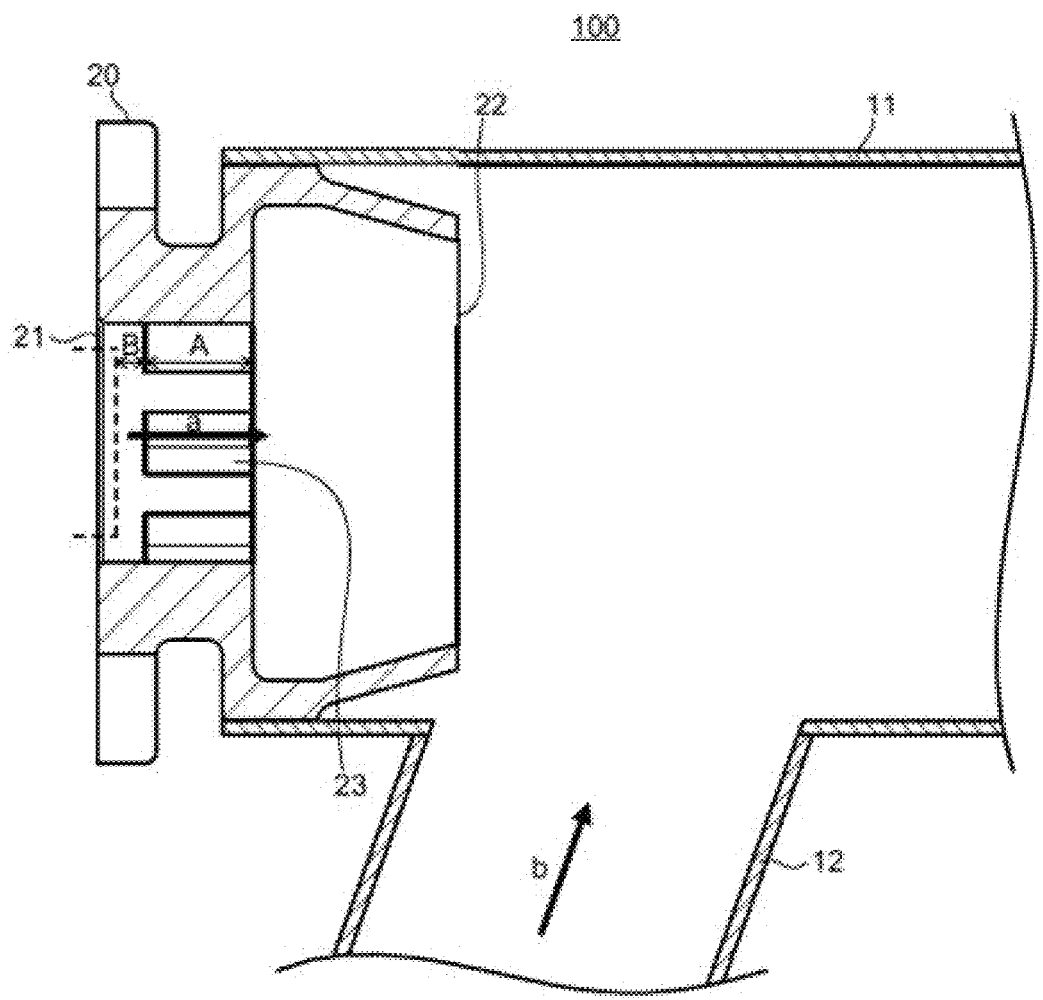
FIG. 2 is a side sectional view schematically illustrating an exhaust structure according to an embodiment of the present disclosure.

FIG. 2 is a side sectional view schematically illustrating exhaust structure 100 according to the present embodiment. FIG. 3 is a front view of injector attachment member 20 according to the present embodiment. FIG. 4 is a side sectional view of injector attachment member 20 according to the present embodiment.

Exhaust structure 100 illustrated in FIG. 2 is, for example, mounted on a vehicle (not illustrated) that includes an internal combustion engine (not illustrated). The internal combustion engine may be a diesel engine or a gasoline engine. Exhaust structure 100 is not limited to be applied to an internal combustion engine of a vehicle and is also applicable to, for example, an internal combustion engine of a ship or an internal combustion engine of a stationary type.

Exhaust structure 100 includes injector attachment member 20, first exhaust pipe 11, second exhaust pipe 12, a urea water injector (not illustrated), and a SCR catalyst (not illustrated).

That is, exhaust structure 100 differs from exhaust structure 1 illustrated FIG. 1 in terms of including injector attachment member 20 instead of injector attachment member 10. First exhaust pipe 11, second exhaust pipe 12, the urea water injector, and the SCR catalyst in exhaust structure 100 are the same as first exhaust pipe 11, second exhaust pipe 12, the urea water injector, and the SCR catalyst in exhaust structure 1 described above. Thus, description of those components is omitted, and injector attachment member 20 will be mainly described below.

Injector attachment member 20 is a member for securely attaching the urea water injector to first exhaust pipe 11. While not illustrated, the urea water injector is fixed to, of injector attachment member 20, a portion (a flange portion having first opening portion 21) disposed outside first exhaust pipe 11.

As illustrated in FIG. 2, injector attachment member 20 is a cylindrical body through which a hole extends in an axial direction (the left-right direction in FIG. 2), and injector attachment member 20 has first opening portion 21 and second opening portion 22. That is, injector attachment member 20 has a through hole extending in the axial direction thereof with first opening portion 21 and second opening portion 22 at two ends of the through hole. This through hole is used as an ejection passage for the urea water.

First opening portion 21 is disposed outside first exhaust pipe 11. A nozzle hole (see the dotted line part in FIG. 2 and FIG. 4) of the urea water injector is disposed at first opening portion 21. The urea water injector ejects the urea water in the through hole in the direction (that is, toward second opening portion 22) indicated by arrow a.

Second opening portion 22 is disposed inside first exhaust pipe 11. In other words, second opening portion 22 is disposed to face the inside of first exhaust pipe 11 on the upstream side of the SCR catalyst.

The urea water that has flowed into first exhaust pipe 11 through second opening portion 22 is hydrolyzed by the heat of the exhaust gas. Ammonia generated as a result of this is supplied to the SCR catalyst. Then, at the SCR catalyst, nitrogen oxide (NOx) in the exhaust gas is reduced into nitrogen by the ammonia.

Here, as described in the description of exhaust structure 1 as a comparative example, a flow of the exhaust gas that flows from first exhaust pipe 11 into injector attachment member 10 and then flows toward the nozzle hole (may be referred as first opening portion 21) of the urea water injector may be generated also in exhaust structure 100.

Thus, in the present embodiment, the inner peripheral surface of injector attachment member 20 is provided with ribs (may be referred to as protrusions) 23 that change a flow direction of the exhaust gas from second opening portion 22 toward first opening portion 21 to a flow direction from first opening portion 21 toward second opening portion 22.

Figure 3:
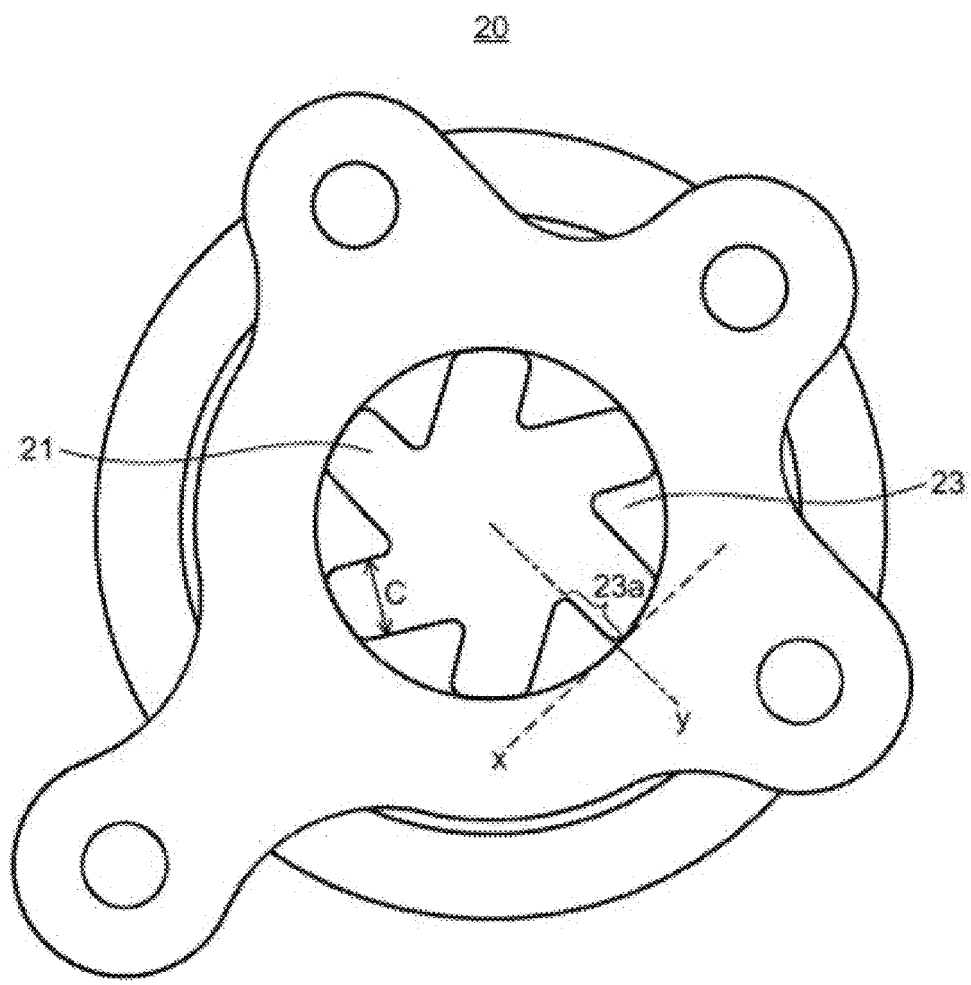
FIG. 3 is a front view of an injector attachment member according to an embodiment of the present disclosure.
Figure 4:
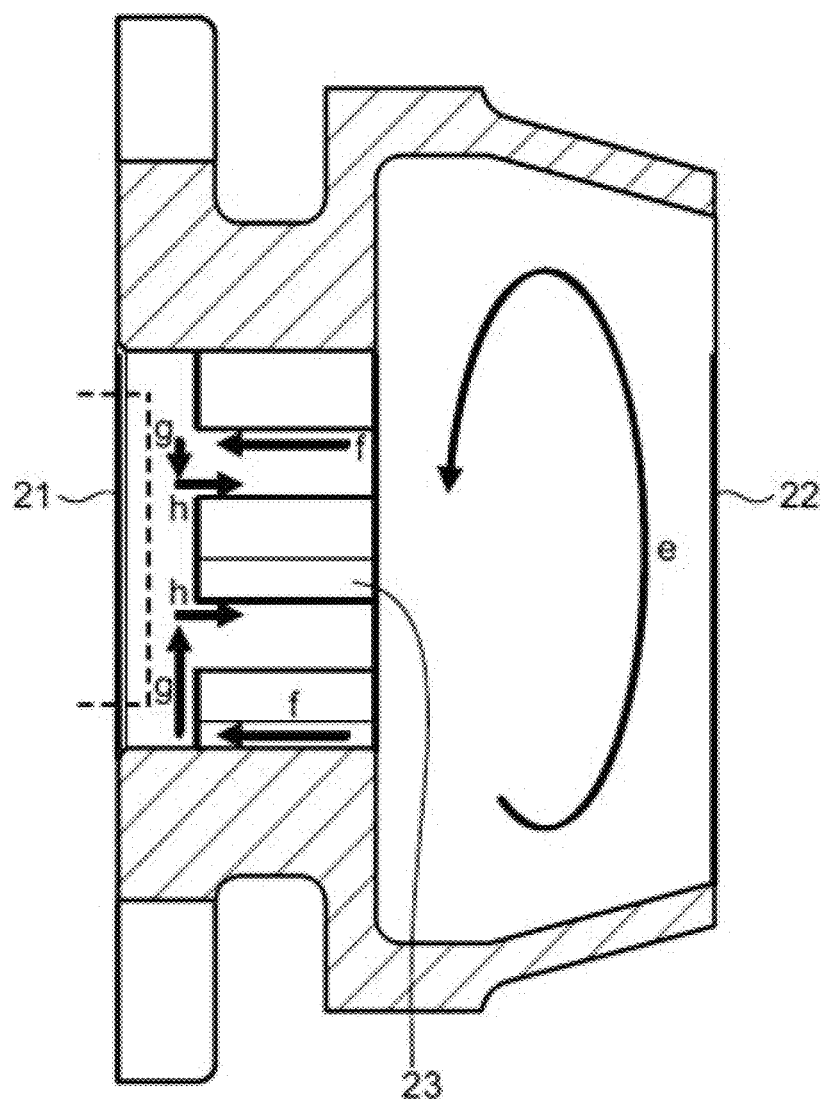
FIG. 4 is a side sectional view of the injector attachment member according to an embodiment of the present disclosure.

As illustrated in FIG. 2 to FIG. 4, a plurality of ribs 23 are separated from each other with a predetermined space (see arrow C illustrated in FIG. 3) between ribs 23 in the inner circumferential direction of injector attachment member 20.

As illustrated in FIG. 3, ribs 23 are provided to protrude in the radial direction from the inner peripheral surface of injector attachment member 20.

As illustrated in FIG. 3, each rib 23 has wall surface (hereinafter referred to as perpendicular wall surface) 23a perpendicular to the inner peripheral surface of injector attachment member 20. In other words, as illustrated in FIG. 3, when injector attachment member 20 is viewed from the front, perpendicular wall surface 23a is provided along normal line y orthogonal to tangent line x of an inner peripheral circle of injector attachment member 20.

As illustrated in FIG. 2 and FIG. 4, ribs 23 extend in the axial direction of injector attachment member 20 (see arrow A illustrated in FIG. 2).

As illustrated in FIG. 2, each rib 23 extending in the axial direction has two end portions, and one of the end portions closer to first opening portion 21 is separated by a predetermined distance (see arrow B illustrated in FIG. 2) from the nozzle hole of the urea water injector.

In the present embodiment, a case where the diameter of an upstream portion (specifically, a portion where first opening portion 21 and ribs 23 are provided) of the through hole of injector attachment member 20 is smaller than the diameter of a portion of the through hole on the downstream side of the upstream portion, as illustrated in FIG. 2 and FIG. 4, is presented as an example. Through hole is, however, not limited thereto.

Next, a flow of the exhaust gas caused by an effect of above-described ribs 23 will be described with reference to FIG. 4.

Arrow e indicates a swirl flow of the exhaust gas that flows into injector attachment member 20 through second opening portion 22 and then flows toward first opening portion 21.

The swirling exhaust gas comes into contact with ribs 23 (specifically, perpendicular wall surfaces 23a illustrated in FIG. 3). Consequently, the exhaust gas is caused to flow linearly and flows in an extension direction (the left-right direction in FIG. 4) of ribs 23 toward the direction indicated by arrow f.

Next, the exhaust gas flows toward the center of the through hole in the radial direction as indicated by arrow g. At this time, the exhaust gas flows through a portion (between the nozzle hole of the urea water injector and end portions of ribs 23) indicated by arrow B illustrated in FIG. 2.

Next, the exhaust gas flows toward second opening portion 22 as indicated by arrow h. At this time, the exhaust gas flows through a portion (between ribs 23 adjacent to each other) of arrow C illustrated in FIG. 3.

The exhaust gas that has passed through ribs 23 is drawn to the center of the swirl flow indicated by arrow e and then flows into first exhaust pipe 11 (not illustrated in FIG. 4) illustrated in FIG. 2 through second opening portion 22.

As described above, exhaust structure 100 in the present embodiment includes first exhaust pipe 11 through which exhaust gas discharged from an internal combustion engine flows; a urea water injector that ejects urea water; a SCR catalyst that is provided on the downstream side of an ejection position of the urea water inside first exhaust pipe 11; and injector attachment member 20 for securely attaching the urea water injector to first exhaust pipe 11. Injector attachment member 20 is a cylindrical body through which a hole extends in an axial direction, and injector attachment member 20 is attached to first exhaust pipe 11 such that the nozzle hole of the urea water injector is disposed at first opening portion 21 and that second opening portion 22 faces the inside of first exhaust pipe 11 on the upstream side of the SCR catalyst. The inner peripheral surface of injector attachment member 20 is provided with ribs 23 that change the flow direction of the exhaust gas from second opening portion 22 toward first opening portion 21 to the flow direction from first opening portion 21 toward second opening portion 22.

With this feature, it is possible to prevent the exhaust gas from accumulating in injector attachment member 20 and thus is possible to suppress adhesion of urea to the vicinity of the nozzle hole of the urea water injector. As a result, a decrease in efficiency in ejection of urea water is suppressed and sufficient ammonia can be supplied to the SCR catalyst. It is thus possible to prevent poor purification of exhaust gas.

Note that the present disclosure is not limited by the description of the aforementioned embodiment and can be variously modified within the scope that does not deviate from the gist of the present disclosure.

The present application is based on Japanese Patent Application (Japanese Patent Application No. 2021-200065), filed on Dec. 9, 2021, the contents of which are incorporated herein by reference.

INDUSTRIAL APPLICABILITY

The exhaust structure and the injector attachment member according to the present disclosure are useful for a technology that purifies exhaust gas from an internal combustion engine by a reducing agent and a catalyst.

REFERENCE SIGNS LIST 1, 100 exhaust structure
10, 20 injector attachment member
11 first exhaust pipe
12 second exhaust pipe
13, 21 first opening portion
14, 22 second opening portion
23 rib
23a perpendicular wall surface

The invention claimed is:

1. An exhaust structure, comprising:
   an exhaust pipe through which exhaust gas discharged from an internal combustion engine flows;
   a urea water injector that ejects urea water;
   a selective catalytic reduction (SCR) catalyst that is provided on a downstream side of an ejection position of the urea water inside the exhaust pipe; and
   an injector attachment member for securely attaching the urea water injector to the exhaust pipe, wherein
   the injector attachment member is a cylindrical body through which a hole extends in an axial direction, and
   the injector attachment member is attached to the exhaust pipe such that a nozzle hole of the urea water injector is disposed at a first opening portion of the injector attachment member and that a second opening portion of the injector attachment member faces an inside of the exhaust pipe on an upstream side of the SCR catalyst, and
   wherein an inner peripheral surface of the injector attachment member is provided with a rib that changes a flow direction of the exhaust gas from the second opening portion toward the first opening portion to a flow direction from the first opening portion toward the second opening portion,
   wherein the rib has a wall surface that is perpendicular to the inner peripheral surface of the injector attachment member and is parallel to the axial direction of the injector attachment member.

2. The exhaust structure according to claim 1, wherein the rib extends in the axial direction.

3. The exhaust structure according to claim 2, wherein the rib extending in the axial direction has end portions, and one of the end portions closer to the first opening portion is separated from the nozzle hole of the urea water injector by a predetermined distance.

4. The exhaust structure according to claim 1, wherein the rib includes a plurality of ribs that are separated from each other with a predetermined space between the ribs in an inner circumferential direction of the injector attachment member.

5. The exhaust structure according to claim 1, further comprising:
   another exhaust pipe that is connected to the exhaust pipe to be on an upstream side of the SCR catalyst and on a downstream side of the injector attachment member and that causes the exhaust gas to flow into the exhaust pipe.

6. An injector attachment member to be used in an exhaust structure including an exhaust pipe through which exhaust gas discharged from an internal combustion engine flows, a urea water injector that ejects urea water, and a selective catalytic reduction (SCR) catalyst that is provided on a downstream side of an ejection position of the urea water inside the exhaust pipe, the injector attachment member being a member to be used for securely attaching the urea water injector to the exhaust pipe,
   wherein the injector attachment member is a cylindrical body through which a hole extends in an axial direction, and the injector attachment member is attached to the exhaust pipe such that a nozzle hole of the urea water injector is disposed at a first opening portion of the injector attachment member and that a second opening portion of the injector attachment member faces an inside of the exhaust pipe on an upstream side of the SCR catalyst, and wherein the injector attachment member is provided with, at an inner peripheral surface of the injector attachment member, a rib that changes a flow direction of the exhaust gas from the second opening portion toward the first opening portion to a flow direction from the first opening portion toward the second opening portion,
   wherein the rib has a wall surface that is perpendicular to the inner peripheral surface of the injector attachment member and is parallel to the axial direction of the injector attachment member.

* * * * *